United States Patent
Duval et al.

(10) Patent No.: US 8,821,116 B2
(45) Date of Patent: Sep. 2, 2014

(54) ABRADABLE COATING SYSTEM

(75) Inventors: Sophie Duval, Zürich (CH);
Piero-Daniele Grasso, Niederweningen (CH); Sven Olliges, Brüttisellen (CH); Joergen Ferber, Wutoeschingen (DE); Alexander Stankowski, Würenlingen (CH)

(73) Assignee: Alstom Technology Ltd., Baden (CH)

( * ) Notice: Subject to any disclaimer, the term of this patent is extended or adjusted under 35 U.S.C. 154(b) by 826 days.

(21) Appl. No.: 12/915,978

(22) Filed: Oct. 29, 2010

(65) Prior Publication Data

US 2011/0103940 A1     May 5, 2011

Related U.S. Application Data

(60) Provisional application No. 61/256,393, filed on Oct. 30, 2009.

(51) Int. Cl.
*F01D 11/12*       (2006.01)
*F01D 5/00*       (2006.01)
*F01D 5/28*       (2006.01)

(52) U.S. Cl.
CPC ............. *F01D 11/122* (2013.01); *Y02T 50/672* (2013.01); *F05D 2300/603* (2013.01); *Y02T 50/67* (2013.01); *F01D 11/125* (2013.01); *F05D 2300/612* (2013.01); *F05D 2230/90* (2013.01); *F05D 2300/21* (2013.01); *F01D 5/005* (2013.01); *F05D 2300/6012* (2013.01); *F05D 2300/615* (2013.01); *F01D 5/284* (2013.01)
USPC ....................................... 415/173.4

(58) Field of Classification Search
USPC ............ 415/173.4, 174.4; 416/229 R, 241 A, 416/241 B, 241 R; 427/140, 142, 202, 205, 427/244, 243, 372.2, 385.5, 388.1, 397.7
See application file for complete search history.

(56) References Cited

U.S. PATENT DOCUMENTS 3,970,319 A * 7/1976 Carroll et al. ................. 277/414
4,323,756 A     4/1982 Brown et al.
(Continued)

FOREIGN PATENT DOCUMENTS

DE      10219983      12/2003
EP      1231010      8/2002
(Continued)

OTHER PUBLICATIONS

Non-Final Office Action from co-pending U.S. Appl. No. 12/915,951, (Nov. 23, 2012).
(Continued)

*Primary Examiner* — Liam McDowell
(74) *Attorney, Agent, or Firm* — Buchanan Ingersoll & Rooney PC (57) ABSTRACT

An abradable coating system (2-8) for a turbine or a compressor is proposed has at least one layer of woven or non-woven tissue (15) or foam made of: ceramic, glass, glass-ceramic, ceramic-metal composite and combinations thereof. A free-standing preformed element (18) has at least one layer of such a woven or non-woven tissue or foam is filled with fillers and/or binder. A method prepares such a system. Finally, a method for the repair of an abradable coating portion of a turbine or the compressor component (9) includes in a first optional step that the damaged portion is at least partly removed and/or cleaned and/or surface treated, and in a second step at least one free-standing preformed abradable coating element (18) or a complete abradable coating system is attached to the component (9), preferably by using a matrix, wherein for example only a center part (2) or a fraction of a center part (2) is replaced.

28 Claims, 3 Drawing Sheets

(56) References Cited

U.S. PATENT DOCUMENTS

| | | | |
|---|---|---|---|
| 4,595,637 A * | 6/1986 | Eaton et al. | 428/608 |
| 4,738,902 A | 4/1988 | Prewo et al. | |
| 4,772,773 A | 9/1988 | Hashimoto et al. | |
| 4,968,383 A | 11/1990 | Volkmann et al. | |
| 5,038,014 A | 8/1991 | Pratt et al. | |
| 5,047,966 A | 9/1991 | Crow et al. | |
| 5,121,329 A | 6/1992 | Crump | |
| 5,218,013 A * | 6/1993 | Schock | 523/209 |
| 5,269,057 A | 12/1993 | Mendham | |
| 5,622,474 A * | 4/1997 | Werner et al. | 415/173.1 |
| 5,876,550 A | 3/1999 | Feygin et al. | |
| 5,900,170 A | 5/1999 | Marcin, Jr. et al. | |
| 5,913,555 A | 6/1999 | Richter et al. | |
| 6,057,047 A * | 5/2000 | Maloney | 428/623 |
| 6,064,031 A | 5/2000 | Talwar | |
| 6,144,008 A | 11/2000 | Rabinovich | |
| 6,365,222 B1 * | 4/2002 | Wagner et al. | 427/140 |
| 6,435,824 B1 | 8/2002 | Schell et al. | |
| 6,457,939 B2 | 10/2002 | Ghasripoor et al. | |
| 6,508,000 B2 | 1/2003 | Burke et al. | |
| 6,526,327 B2 | 2/2003 | Kar et al. | |
| 6,583,381 B1 | 6/2003 | Duignan | |
| 6,672,343 B1 | 1/2004 | Perret et al. | |
| 6,733,907 B2 * | 5/2004 | Morrison et al. | 428/699 |
| 6,838,157 B2 | 1/2005 | Subramanian | |
| 6,861,613 B1 | 3/2005 | Meiners et al. | |
| 6,912,446 B2 | 6/2005 | Wang et al. | |
| 6,916,529 B2 * | 7/2005 | Pabla et al. | 428/325 |
| 7,479,328 B2 * | 1/2009 | Roth-Fagaraseanu et al. | 428/632 |
| 2001/0014403 A1 | 8/2001 | Brown et al. | |
| 2003/0082297 A1 * | 5/2003 | Wolkers et al. | 427/140 |
| 2003/0196305 A1 | 10/2003 | Kebbede et al. | |
| 2005/0123785 A1 | 6/2005 | Sahoo et al. | |
| 2005/0164027 A1 * | 7/2005 | Lau et al. | 428/632 |
| 2006/0019087 A1 | 1/2006 | Mazzola et al. | |
| 2007/0084047 A1 | 4/2007 | Lange et al. | |
| 2007/0141375 A1 | 6/2007 | Budinger et al. | |
| 2008/0178994 A1 | 7/2008 | Qi et al. | |
| 2008/0182017 A1 | 7/2008 | Singh et al. | |
| 2009/0148278 A1 | 6/2009 | Allen | |
| 2010/0151183 A1 * | 6/2010 | Davis et al. | 428/95 |

FOREIGN PATENT DOCUMENTS

| | | |
|---|---|---|
| EP | 1273675 | 1/2003 |
| EP | 1392957 | 3/2004 |
| EP | 1620225 | 2/2006 |
| EP | 1674192 | 6/2006 |
| EP | 1734146 | 12/2006 |
| EP | 1860084 A1 | 11/2007 |
| EP | 1887107 | 2/2008 |
| EP | 1975271 | 10/2008 |
| GB | 2121884 A | 6/1983 |
| GB | 2148755 | 6/1985 |
| WO | WO92/10343 | 6/1992 |
| WO | WO98/24574 | 6/1998 |
| WO | WO03/010419 | 2/2003 |
| WO | WO2008/046386 | 4/2008 |
| WO | WO2008/092461 | 8/2008 |
| WO | WO2008/155021 | 12/2008 |
| WO | 2011/009433 A1 | 1/2011 |

OTHER PUBLICATIONS

Non-Final Office Action from co-pending U.S. Appl. No. 12/915,920 (Mar. 28, 2013).
Final Office Action from co-pending U.S. Appl. No. 12/915,951 (Apr. 1, 2013).
European Search Report for EP Patent App. No. 10186339.7 (Feb. 23, 2011).
Non-Final Office Action from co-pending U.S. Appl. No. 12/916,032 (Dec. 13, 2012).
Extended European Search Report dated Aug. 27, 2013, issued by European Patent Office in corresponding European Patent Application No. 10186341.3 (7 pgs.).

* cited by examiner

ABRADABLE COATING SYSTEM

This application claims priority under 35 U.S.C. §119 to U.S. Provisional application no. No. 61/256,393, filed 30 Oct. 2009, the entirety of which is incorporated by reference herein.

BACKGROUND

1. Field of Endeavor

The present invention relates to an abradable coating system, a free-standing preformed element therefor, as well as to methods for making such system/preformed elements, and to turbine and compressor components having such structures, and to a repair scheme.

2. Brief Description of the Related Art

Compressors and turbines of gas and steam turbine engines are provided with abradable coatings at several positions. Abradable coatings are, for example, provided on the radial inner surfaces of compressor and/or turbine stator components.

Abradable coatings in this context are, e.g., known from: EP 1 392 957; EP 1 734 146; EP 1 975 271; EP 1 273 675; WO 03/010419; U.S. Patent Application Publication No. 2005/0123785; U.S. Patent Application Publication No 2009/0148278; and U.S. Pat. No. 6,457,939.

SUMMARY

One of numerous aspects of the present invention includes an improved abradable coating system to be mounted on a turbine or compressor component, as well as elements therefore, and methods for making such an abradable coating system, and in addition to that, a method for repairing an abradable coating system, preferably in an on-site repair process. This can be in relation to blade sealing against the stator heat shield, but also to vane sealing against the rotor.

In the state-of-the-art, there are limitations in the design due to the materials and the processes used. Another aspect of the present invention relates to a design and related process/materials, which enables, among others, a more efficient clearance and a flexible coating solution, which can be adjusted for all engines and all operation conditions due to the absence of limitation for the coating thickness. Further there are fewer risks of damage of blade tip/vane tip, coating spallation and erosion due to the structuring. Some important technical differentiations include the controlled properties on the micrometer, millimeter, and centimeter range in the three dimensions, which implies a better abradability and mechanical integrity. This is achieved with a customized combination of the tissue and the impregnated matrix providing an unexpected optimum compromise between abradability and erosion.

Indeed, for example none of the constructions mentioned above permits successfully achieving mechanical integrity of the system and efficient clearance reduction of 2 mm and more. Another aspect of the present invention therefore includes a 3D-graded design and provides an abradable coating with superior abradability and spallation resistance.

Customized abradable properties can be, for example, achieved by:
- a gradient along z (radial direction of the turbine/compressor) achieved on a millimeter scale by the impregnation of the tissue or the different tissues and impregnation matrix;
- a foam or a fibre structure in the form of a woven or non-woven tissue used is distributed such that it is oriented essentially along y (circumferential direction);
- a controlled porosity, which results from the combination of the used tissue and the impregnation matrix in the plane x-y;

Spalling/erosion resistance can be, for example, achieved by:
- the gradient along z achieved on a millimeter scale by the impregnation into the tissue or the different tissues and impregnation matrix.
- the structure along x-y on a centimeter scale.

Another aspect of the present invention includes an abradable coating with a controlled thickness within a small tolerance in order to obtain an optimal clearance reduction and simultaneously to reduce the risk of blade/vane damage.

Systems and methods embodying principles of the present invention also take into account the needs for a fine structure, by providing a texture on the micrometer range. The structure (pores and optionally fiber direction) in the micrometer range is beneficial in terms of reduced localized damages, abradability and erosion resistance. The structure in the micrometer range can be, for example, achieved by:
- the orientation of the fibers of the tissue;
- the inherent porosity to the tissue or foam;
- the impregnation matrix.

The structure in the millimeter range is beneficial for strain tolerance, mechanical integrity, a more efficient clearance reduction, and can be achieved by:
- designing the impregnation into the tissue
- combining differently impregnated tissues together
- texturing the surface The structure in the centimeter range is beneficial for mechanical integrity, and can be achieved by:
- designing the impregnation material into the tissue on the side of the component.

More specifically, another aspect of the present invention relates to an abradable coating system for a turbine or a compressor (steam turbines or gas turbines being possible, also inclusive of turbomachines with compressor and turbine) having at least one layer of woven or non-woven tissue based on fibers or foam made of a material selected from the group consisting of: ceramic, glass, glass-ceramic, ceramic-metal composite and combinations thereof, in combination with an impregnation material (forming a matrix) comprising filler particles or filler fibers, e.g., made of materials selected from the group consisting of: ceramic, glass, glass-ceramic, and ceramic-metal composite, and a binder of organic and/or inorganic polymers. The abradable coating system can be applied to a turbine or compressor component. The expression filler particle also includes filler fibers.

For example, it is possible to use a felt made of YSZ fibers and impregnated with a slurry made of alumina precursors, YSZ, and silicate.

The impregnation material or matrix comprises filler particles and/or filler fibers as well as at least one binder. The matrix can be applied as a slurry. Organic binders will normally essentially disappear/decompose due to heat treatment and/or operation of the turbine/compressor.

Preferentially, at least in the surface region of the system, a stripe-like circumferential center part is bordered, preferably at both sides, in the axial direction, by stripe-like circumferential side parts.

The center part or core is highly abradable such that it is essentially abraded without blading tip reinforcement as soon as the blading tip is running into the coating. The running in can occur during a run-in procedure or after few hours of operation or after several thousands of hours when rotor sagging or ovalization occur.

When talking about blading direction and blading tip reinforcement, generally this shall include blading in the broad sense. Thus, it includes rotating blades and the corresponding associated sealing on stationary parts of the machine, as well as stationary vanes and the corresponding associated sealing on rotating parts of the machine (e.g., on the rotor). When talking about rotation direction of the blades or rotation of blade, this shall include the corresponding situation with vanes, and thus also the rotation direction of the rotor with respect to the vanes.

On the other hand, the side part(s) are less or essentially not abradable and erosion resistant. Preferentially the center part has a width in the axial direction essentially at least identical to one third of the width of the tip portion of the corresponding blade/vane, which may contact and rub. Clearly the whole width of the system including the side parts is normally at least as wide as the width of the corresponding blade/vane tip width.

In the center part, the abradability can be graded along a radial direction z (radial with respect to the turbine/compressor axis), preferably on the millimeter scale, such that in the surfacial region of the system it is more abradable than on the side facing the turbine or compressor component on which the system is mounted The surface of the center part can be provided with a surface texturing with dimensions along the radial direction z with respect to the turbine axis in the range of 0.2-4 mm, preferably in the range of 1-2 mm. This surface texturing can be generated by isostatic hot pressing or by using polymers or by applying a material similar to the impregnation matrix.

The differentiation between center part and side part(s) can for example also be provided by using for both parts the same materials but providing a surface texturing in the center part only.

The differentiation between the center part of the side parts can also be achieved by using the same tissue but by using a different impregnation matrix material and/or a different degree of impregnation (see further below).

The fibers of the woven or non-woven tissue are preferentially essentially aligned along the rotation direction, that is, in a circumferential direction. Preferably in this case at least in the surface region the system includes a stripe-like, circumferentially oriented center part based on a layer of woven or non-woven impregnated tissue bordered, typically at both sides in the axial direction, by a stripe-like circumferentially oriented side part, wherein at least in the center part the fibers of the woven or non-woven tissue are essentially aligned along the rotation direction and wherein the center part is highly abradable such that it is preferably abraded without blading tip reinforcement, and wherein the side part(s) are less abradable and are preferably essentially erosion resistant. Again preferably the center part has a width in the axial direction at least identical to one third of the width of the tip portion of the corresponding blading potentially coming into contact with the seal when rotating.

The layer of woven or non-woven tissue or foam is, according to yet another preferred embodiment, at least partly impregnated by a matrix material of a composition of optionally filler particles/fibres and binder, wherein preferably the filler particles/fibres are metal, ceramic, glass, glass-ceramic, oxide precursors and/or wherein preferably optionally the binder is an organic and/or inorganic polymer.

Examples (without being not limited to these) of filler particles/fibres include YSZ, Al2O3, SiO2, aluminum hydroxide, SiC, CeO2, and Aluminum toughened zirconia.

Examples (without being not limited to these) of inorganic binders include alkali silicate, alumino silicate, aluminum phosphate and, for organic binders, polyvinyl butyrol. The organic binders typically decompose upon heat treatment/ sintering or during operation of the turbine/compressor.

A system as described herein can, according to yet another preferred embodiment, be applied as a monoblock or as an assembly of several blocks on a turbine or compressor component. Preferably it is applied on a stator heat shield on a metal or ceramic surface. According to a preferred embodiment, the system is applied on the component with a matrix (e.g., applied as a slurry) then acting as a glue, preferably a curable matrix cured by irradiation and/or heat.

The system can also include a stratified multilayer element of several laminated layers, which has a total height in a radial direction (z) in the range of 0.2-4 mm, preferably in the range of 1-2 mm, wherein preferentially individual abradable coating material layers have typically a thickness in the range of 0.1-0.4 mm. The proposed system can also be provided with cooling elements, wherein preferably these cooling elements are provided as channels and/or grooves in the monoblock or assembly of several block structures. Such cooling channels can for example be provided on the side facing away from the hot gas channel such that, between the component and the abradable coating system, cooling medium, normally cooling air, can flow.

In addition, another aspect of the present invention relates to a component, a turbine, or a compressor with such an abradable coating system mounted thereon.

In addition, yet another aspect of the present invention relates to a free-standing preform for a turbine or a compressor comprising at least one layer of woven or non-woven tissue or foam made of a material selected from the group consisting of ceramic, glass, ceramic-metal composite material, and combinations thereof, wherein preferably the fibers of the woven or preferably non-woven tissue are essentially aligned along one specific direction.

Another aspect of the present invention relates to a (on-site or off-site) method for the manufacturing of a system or a free-standing preform as described herein, wherein in a first step at least one free-standing, preformed abradable coating element for a turbine or a compressor comprising at least one layer of woven or non-woven tissue or foam material based on fibers made of a material selected from the group consisting of ceramic, glass, ceramic-metal composite material, and combinations thereof, is made, optionally combined and joined with, one or several additional such free-standing preformed abradable coating elements, and wherein in a second optional step the abradable coating system is attached to a turbine or compressor component with a matrix acting as a glue or adhesion promoter, preferably a curable glue cured by irradiation and/or heat.

In the first step of making the free-standing. preformed abradable coating element and/or after the second step of attachment thereof on the gas turbine or compressor component, the woven or nonwoven tissue or foam can, according to a preferred embodiment of the method, at least partly be embedded in or impregnated with a matrix of a composition of filler particles/fibers and binder, wherein preferably the filler particles/fibers are oxides or oxide precursors and/or wherein preferably the binder is an organic and/or inorganic polymer, and wherein preferably the matrix material is immersed into the tissue material in liquid state and hardened therein. A grading along the radial direction of the turbine and/or compressor in the final coating element can be achieved by differential immersion and/or differential choice of matrix material and/or by using differentially structured layers in the stack of several layers.

A multitude of free-standing, preformed abradable coating element layers with a thickness of up to 4 mm can be produced and subsequently laminated by using, for example, an adhesion layer to form a final abradable coating system, preferably with a total height in a radial direction (z) in the range of 0.2-4 mm, preferably in the range of 1-2 mm.

In the first step, for example in a process using a roll or another source of tissue, the source is at least partly impregnated by a liquid matrix material of a composition of filler particles/fibers and binder, wherein preferably the filler particles/fibers are oxides or oxide precursors and/or wherein preferably the binder is an organic and/or inorganic polymer, and wherein the structure is optionally pressed and/or cured and/or heated in a compression mould to give a final three-dimensional shape, most preferably with graded properties along the z direction.

Yet another aspect of the present invention relates to a method for the repair (on-site or off-site) of an abradable coating portion of a turbine or a compressor component, wherein in a first optional step the damaged portion is at least partly removed and/or cleaned and/or surface treated, and wherein in a second step at least one free-standing, preformed abradable coating element as described herein, or a complete abradable coating system as described herein, is attached to the component, preferably by using a curable matrix/glue, wherein preferably only a center part or a fraction of a center part is replaced.

A summary of some aspects of the invention and some potential advantages includes:
- no need for a tip reinforcement of the blade/vane;
- application (and repair) on-site possible;
- no limitation for the thickness of the coating and better tolerance compared to coatings applied by thermal spraying;
- better clearance reduction during the whole operation interval;
- smaller risk of damages of component, in particular blade/vane tip;
- smaller risk of coating spallation and subsequent flying object damage, clogging of the cooling air holes in later turbine stage;
- low cost compared with abradable coatings applied by thermal spraying;
- quick fix for plants experiencing performance loss before the end of the service interval;
- easier run-in procedure or no run-in procedure;
- functional system even after several thousands of operation hours (for example even in case of rotor sagging).

Further embodiments of the invention are described in the following detailed description.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION OF EXEMPLARY EMBODIMENTS

Figure 1A:
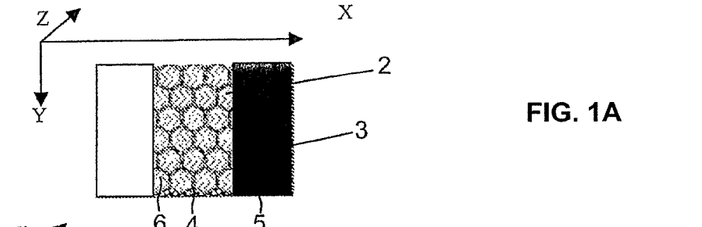
FIG. 1 shows, in a), a top view onto an abradable coating system applied on a component and, in b), a radial cut through an abradable coating system according to the invention applied on a component.
Figure 1B:
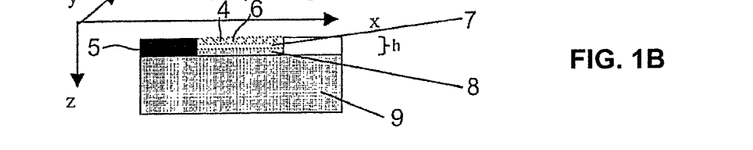

FIG. 1 shows in a) top view and in b) a cut perpendicular to the plane of the system and to the direction of the stripes 2,3, that is, a radial cut (radial with respect to the turbine/compressor axis) through a coating system embodying principles of the present invention, which is mounted on a stator heat shield or component 9.

On component 9 there is provided an abradable coating system with a central circumferential stripe (circumferential with respect to a turbine/compressor axis) which is designated as center part 2 bordered on both sides by also circumferential stripes which are designated as side parts 3. The abradability of these parts 2, 3 is differential, in that the side parts 3 are less abradable and are more resistant to abrasion than the center part 2. This is achieved in that the side parts 3 are formed by tissues with matrix 1, while the center part 2 is formed by a three layer structure having a bottom layer which is based on a tissue with matrix 4 designated with reference number 8, followed by a tissue with matrix 3 designated with reference number 7, and a surface coating layer based on a tissue with matrix number 2 designated with reference number 6. These tissues with different matrices are differing in their abrasion properties.

The layer 5 with low abrasion property, defining the side parts 3, has a tissue and/or a matrix providing low abradability.

Within the center part 2, the layers are graded in that the top layer, i.e., the tissue 6 with matrix 2 has the highest abradability. This is not only provided by a corresponding selection of tissue material and/or tissue density and matrix, but also supplemented by a surface texturing 4, which in this case is a honeycomb surface structure of indentations designated with reference number 4.

This surface layer 6 of center part 2 is followed by layer 7, which has a higher resistance to abrasion than layer 6 but still lower abrasion resistance than layer 5.

This layer 7 is followed in the direction of the component 9 by yet another layer 8 with a higher abrasion resistance than layer 7.

The tissue and the matrix give the characteristic (i.e., erosion resistance, durability, abradability, porosity) of the corresponding layer and of the final complete system. The final characteristic can further be altered by the above-mentioned surface texturing. As concerns the tissue, the characteristics can be adapted by a corresponding choice of the tissue material and/or by the choice of the corresponding tissue density and/or fiber thickness. As concerns the matrix, the properties can be adapted by a corresponding choice of the filler particles/fibers and/or of the bonding agents and optional additional constituents making up the matrix as well as by the degree of impregnation of matrix material.

In an overall summary, table 1 lists features of systems and methods embodying principles of the present invention which can differentiate from the state of the art.

TABLE 1

Overview over the comparison of the state of the art and the application's system.

| Type of a structure/texture for abradable coating system | State-of-the-art | | Embodiments of this application | |
|---|---|---|---|---|
| | Type and direction of the structure/texture | Technical approach | Type and direction of the structuring | Technical approach |
| In the centimeter range | Hardness along x and y the same | Islands of materials, vertically cracked materials | Hardness along x: on the side, a durable and erosion resistant in the center, an easily abradable system | Along x: different blocks (i.e. different tissues impregnated with different matrices) or monoblock (one tissue impregnated with masking process) |
| | Texturing along x-y | grid or honeycomb | Optionally, texturing along x-y | Grid or honeycomb structures achieved by (hot) pressing the tissue. The surface structuring is formed on the main coating body. |
| In the millimeter range | — | — | Along z | By blocks (i.e. assembly of tissues impregnated with different matrices) or monoblock (i.e. graded impregnation of one tissue) |
| In the micrometer range | Homogeneous in all directions | — | Oriented along y or x | Tissue with oriented fibers oriented |

The structure provided in the centimeter range along the x axis is beneficial in order to stabilize the whole coating. In addition in the x-y plane, it creates a labyrinth for the airflow, which reduces the air losses and may improve performance during the start up procedure.

The structure provided in the millimeter, and to another degree in a micrometer, range is beneficial in order to guarantee better integrity of the system and less risks of blading tip damages.

Some important elements of systems and methods described herein are summarized in table 2 as given below:

TABLE 2

Overview of elements of the system.

| Characteristic | Detailed characteristic |
|---|---|
| Shape/design of the abradable coating system | Abradable coating system:<br>is pre-formed:<br>is pre-sintered, and can be:<br>the tissue only<br>the matrix and the tissue<br>or is a green body and can be:<br>the tissue only<br>the matrix and the tissue<br>the tissue and additional organic polymer (in order to reinforce the tissue for an easier application)<br>is a monoblock or several blocks<br>is designed with texturing in the cm range, e.g., the sides are harder than the middle zone<br>the surface is optionally textured in the cm range so that it is achieved, e.g., by (isostatic hot) pressing or by using polymers with a grid structure or any texturing with preferably a honeycomb structure<br>the core has a texture in the millimeter and micrometer range<br>This type of structuring can be:<br>fibers are oriented in the direction y, preferably, or x, depending on the operating conditions<br>the matrix can be locally reinforced with abrasive particles/fibers<br>the matrix is infiltrated in a graded manner along z<br>the erosion resistance and abradability are graded and can be: |

TABLE 2-continued

Overview of elements of the system.

| Characteristic | Detailed characteristic |
| --- | --- |
| | the materials are abradable in the plane x-y in the middle zone, where the blading is running in, and is erosion resistant in the plane x-y on the side in order to stabilize the inner coating |
| | in the middle zone, the coating abradability is graded along the direction z, in order to give the best adhesion and the best stability of the layer, integrity of the system, and abradability |
| | can enable cooling of the parts |
| | is thermally insulating, light weight |
| | has a potential lifetime min. of 1C-cycle |
| Composition of the abradable coating system | A tissue and a matrix: The tissue can be: made of ceramic or glass or ceramic-metal composite or combinations thereof woven (e.g., textile or cloth) or non woven (e.g., felt) An alternative to the tissue can be to use a foam. Matrix can contain a complex composition of filler particles/fibers and binders. The filler particles/fibers can be oxide or oxide precursors or non oxide. They can be selected based on other criteria, such as the criteria of their hardness/abrasive potential. The binder can be an organic or inorganic polymer. It is applied as a liquid, which is hardened The several different tissues can optionally be combined within one block or be used for different assemblies. One or several different matrixes can be used within one assembly. |
| Preparation of the abradable coating system | see embodiments according to FIGS. 7-10 and the corresponding description, or combination thereof, optionally intermediate drying and/or curing is possible |
| Application of the abradable coating system | On-site mounted or dismounted On metallic substrate (e.g., stator heat shield), which can have a curvature and which have optionally a surface treatment (e.g., rough surface obtained by blasting, rough surface of metallic coating) the abradable coating is, e.g., glued to the metallic substrate and the glue is cured by, for example, light radiations (e.g., UV, IR, etc.) or heat (e.g., resistor or heat of the engine) |
| Thickness of the abradable coating system | Up to 4 mm; can be adjusted as needed by a using, for example, several tissues/tissue layers |
| Repair process | Examples: only replacement of the central part or full replacement only replacement of the surface coating and not up to the base metal on mounted or dismounted part |
| Control of the coating quality | e.g., thermography |

Figure 2:
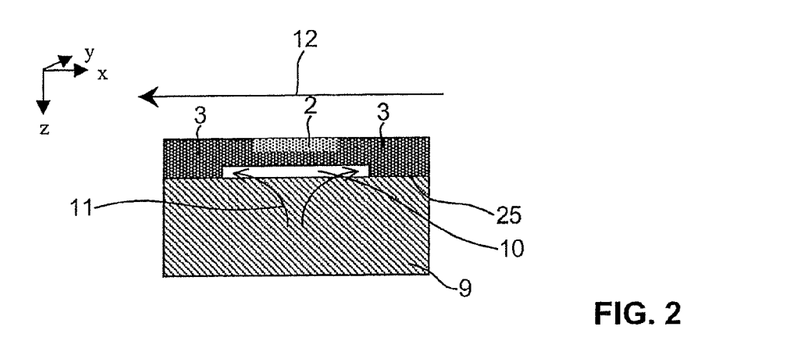
FIG. 2 shows a radial cut through a further embodiment of an abradable coating system applied on a component.

FIG. 2 with cooling channels shows a second embodiment of an abradable coating system according to principles of the present invention. Again along the direction 12 of hot gas flow there are two side parts 3 and a central center part 2. Again the center part 2 is made of a tissue/matrix material combination with significantly higher abradability than the material of the surrounding part 3. Both parts, that is, the center part 2 as well as side parts 3, can be made based on a tissue material with a matrix.

In this case, in order to allow efficient cooling, the abradable sealing system is provided with a groove or channel like structure 10 which, as the system is mounted on substrate 9, allows the flow through of cooling medium such as cooling air 11. In this case there is provided one single cooling channel, it is however also possible to have a row of parallel cooling channels, which may be arranged in a circumferential or in a axial direction or in a combination thereof, and is also possible to have directions in between.

Figure 3:
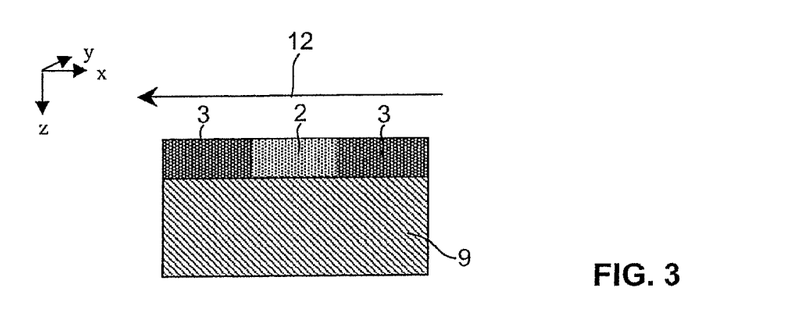
FIG. 3 shows a radial cut through a third embodiment of an abradable coating system applied on a component.

FIG. 3 shows a third embodiment with an erosion resistant coating on the side 3 and a more easily abradable coating in the middle part 2 in the plane x-y. The coating can be realized in one block (monoblock) by impregnation with different matrix materials according to the embodiment of FIG. 8, or by using differing degrees of impregnation. It can be realized also with three separated different blocks or patches according to the embodiment of FIG. 10. In this case, the central part 2 is formed as a block of the same height in the z direction as the side parts 3.

Figure 4:
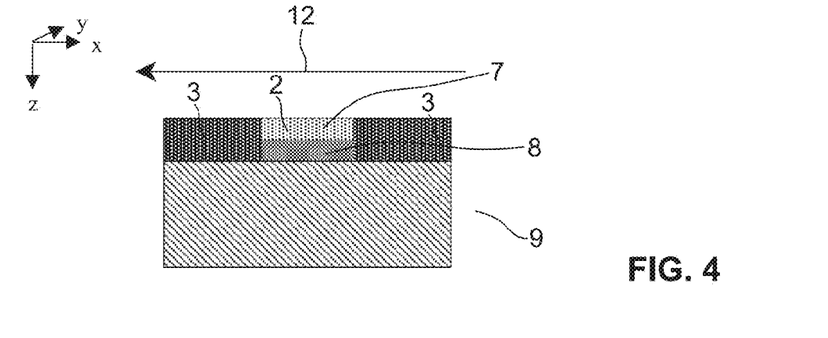
FIG. 4 shows a radial cut through a fourth embodiment of an abradable coating system applied on a component.

Yet another embodiment is schematically illustrated in FIG. 4. This embodiment is provided with a different porosity and/or erosion resistance along z and in the plane x-y. The coating can be realized in one block (monoblock) by impregnation of different matrix materials according to the embodiment of FIG. 8. It can also be realized in four different blocks according to the embodiment of FIG. 10. In this case, there are provided two layers in the central part 2, the abradability properties of which are graded along z (high abradability on the surface), so in contrast to the embodiment according to FIG. 1, where there are three layers in this central region, and to the embodiment according to FIG. 3, where there is only one layer in the region 2, here there are two layers 7, 8 with different abrasion properties.

Figure 5:
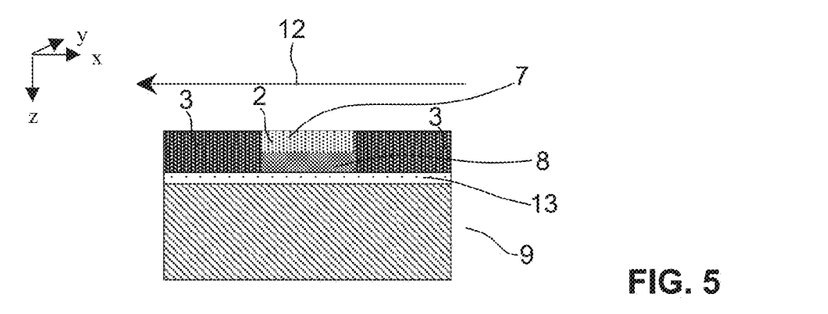
FIG. 5 shows a radial cut through a fifth embodiment of an abradable coating system applied on a component.

FIG. 5 shows yet another embodiment of a coating system with different properties along z and in plane x-y. The coating can be realized in one block by impregnation with different matrix material according to the embodiment of FIG. 8. It can also be realized in five different blocks according to the embodiment of FIG. 10. In this case, below the structure defining the center part 2 and the two side parts 3, there is an additional bottom layer 13. This bottom layer 13 can be part of the actual abradable coating system and contribute to the abradability properties thereof; it can, however, also be an essentially supporting layer, or it can be the adhesion providing layer (glue layer) by which the abradable coating system is attached to component 9.

Figure 6:
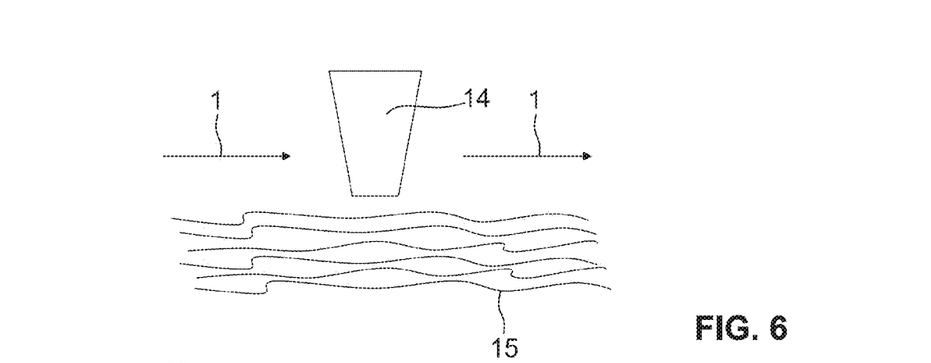
FIG. 6 shows a schematic representation of the orientation of the fibres in the system.

FIG. 6 schematically shows a preferred orientation of the fibers making up the tissue, which is the basis at least for the center part 2 of the abradable coating system. According to FIG. 6, oriented fibers 15 of the tissue and rotating direction 1 are shown (the fiber orientation can also be in the other direction depending on the operating conditions). In other words, the direction of the fibers is preferably essentially in alignment with the direction of the blading 14. Fibers 15 in this particular orientation have the lowest resistance to the blading coming into contact with the corresponding abradable coating system.

In the following, a method of performing an abradable coating is illustrated and discussed.

Figure 7:
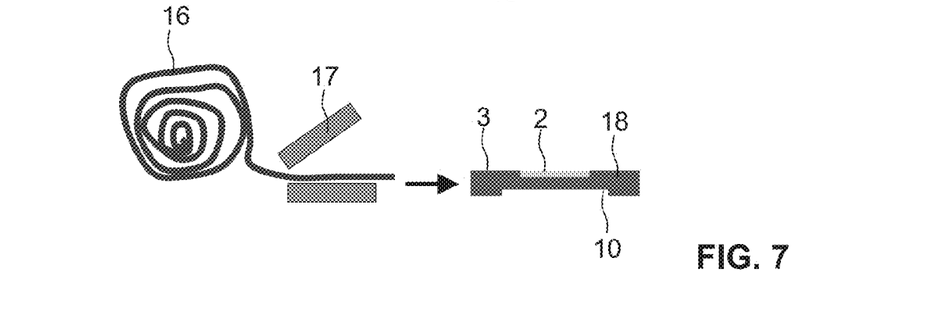
FIG. 7 shows a schematic representation of the production process of a preformed abradable coating element.

FIG. 7 shows, in a schematic representation, a possible moulding or (hot) pressing manufacturing to give the shape and controlled hardness in specific regions. From a roll 16 of tissue material, the tissue material is introduced into the manufacturing process. In this case, the tissue is cut to the appropriate length and then is impregnated and preformed in a compression mould 17. In the compression mould 17 pressure and/or temperature, or with irradiation (UV, VIS), are used to essentially give the appropriate shape to the pre-form.

The coating element 18 has a center part 2 and two side parts 3 and on the face directed towards the substrate 9 there is provided a cooling channel 10 similar to the embodiment illustrated in FIG. 2. The differentiation in abrasion properties in the regions 2, 3 is given by either a differential filling of the tissue with matrix material, as concerns the type of matrix material or as concerns the amount of matrix material with which the tissue material is impregnated. The differentiation can also be achieved by surface texturing (e.g., by mould contours as hot pressing) or a combination of these possibilities.

It is also possible to first form in the compression mould 17 and to then impregnate with the matrix material.

Figure 8:
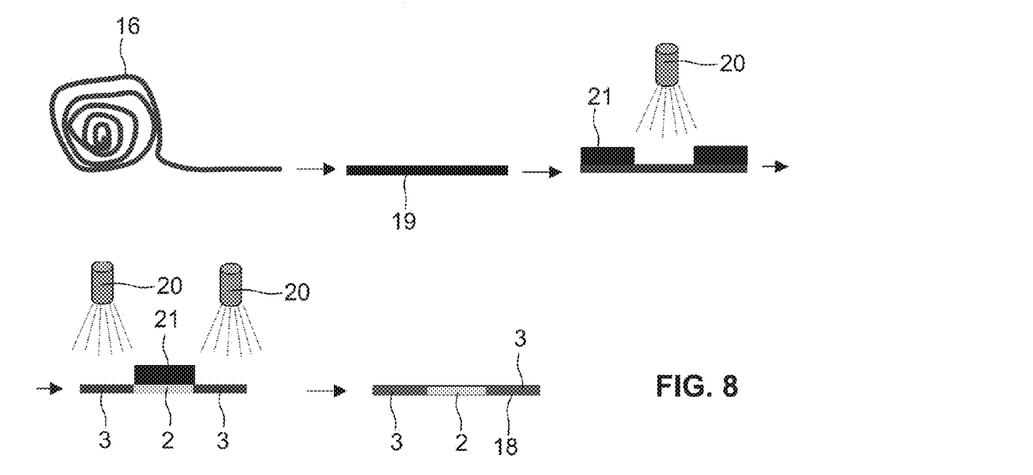
FIG. 8 shows a schematic representation of a second embodiment of a production process of a preformed abradable coating element.

FIG. 8 shows a different possible production process. In this case the tissue material is introduced into the manufacturing process from roll 16 and, in a first step, is cut to length to piece 19. Subsequently in the following step, a mask 21 is applied to one surface and from the side where the mask is located a spray device 20 sprays matrix material onto the unmasked portions of the tissue material. Correspondingly only the central part is impregnated with matrix material in this step.

In the next step (optionally after drying and/or hardening of the central impregnated part) a corresponding complementary mask 21 is put on top of the partially impregnated matrix material, so a mask covering the area in the center 2 which has already been impregnated but leaving free the side portions 3. Now again using spray devices 20, these side portions are impregnated. The differentiation between the center portion 2 and the side portions 3 is either achieved by spraying different types of matrix material in the two subsequent steps or by spraying a different amount of matrix material in the subsequent steps.

After this step, optionally followed by a specific hardening and/or shaping step in a compression mould, the final preformed abradable coating element 18 is ready. It should be noted that between the two steps with spraying the matrix material, a hardening and/or shaping step can also be inserted.

Figure 9:
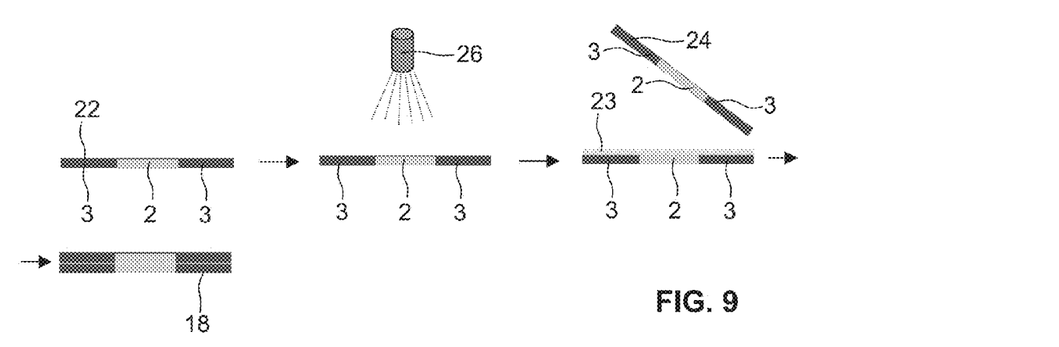
FIG. 9 shows a schematic representation of a production process according to a third embodiment of a preformed abradable coating element.

FIG. 9 shows yet another possible manufacturing process for a multilayer structure. An element as produced as a result of a process according to FIG. 8, is on at least one side preferably sprayed with a spray device 26 with an adhesion layer and a second element, as produced in a process according to FIG. 8, is put on top sandwiching the adhesion layer 23 and leading to a multilayer preformed abradable coating element 18. This processing can be repeated several times building up a multilayer stack, wherein it is for example also possible to stack elements 22 with consecutively increasing abradablility of the center part leading to the above-mentioned grading of the abrasion properties along z in particular in the center portion 2.

Figure 10:
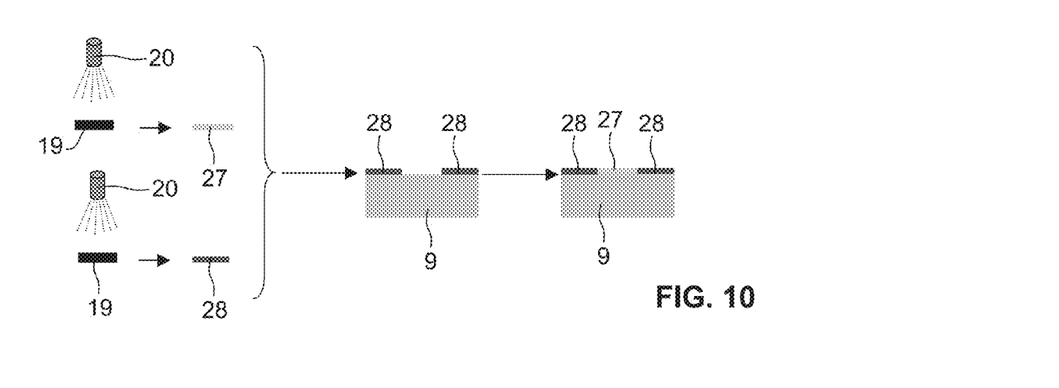
FIG. 10 shows a schematic representation of a production process according to a fourth embodiment of an abradable coating element.

FIG. 10 shows a preparation by block. In individual processing steps, cut-to-length pieces 19 are completely sprayed by devices 20 but differently leading on the one hand to highly abradable center part patches 27 and to less easily abradable side part layer 28. These layers 27, 28 are then mounted on a component 9 as illustrated on the right hand side, for example by first attaching/gluing the side part elements 28 by leaving an inter-space and in a subsequent step adding the center part element 27 in the middle. Of course this sequence can also be reversed depending on the circumstances.

LIST OF REFERENCE SIGNS 1 blade rotation direction
2 center part
3 side part
4 surface texturing
5 tissue with matrix 1
6 tissue with matrix 2
7 tissue with matrix 3
8 tissue with matrix 4
9 substrate
10 cooling channel
11 cooling air
12 direction of hot gas flow
13 additional bottom layer
14 blading
15 fibers of tissue
16 roll of tissue material
17 mould
18 preformed abradable coating element
19 cut to length piece
20 matrix material spray device
21 mask
22 one layer of preformed abradable coating element
23 adhesion layer
24 second layer of preformed abradable coating element
26 glue/adhesion layer spray device
27 center part layer
28 side part layer
h height of abradable coating system in radial direction
x direction parallel to hot gas flow, axial direction
y direction perpendicular to hot gas flow and parallel to blading direction
z radial direction with respect to turbine/compressor axis While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light

We claim:

1. An abradable coating system for clearance reduction in a turbine or a compressor, the turbine or compressor defining an axis of rotation and having blading and a component on which said system can be applied, the system comprising:
   at least one block, wherein the block comprises:
      a woven or non-woven tissue or foam made of a material selected from the group consisting of ceramic, glass, glass-ceramic, ceramic-metal composite, and combinations thereof, and
      filler particles, filler fibers, an inorganic polymer binder, or combinations thereof, at least partially filling the tissue or foam;
   a center part, wherein at least the center part of the system has an abradability which is graded along a radial direction with respect to the axis of rotation, such that the surface region of a side facing the blading is more abradable than an opposite side facing the component, wherein the center part is stripe-like and circumferentially oriented, wherein the center part is highly abradable such that it can be abraded by the blading;
   a pair of stripe-like, circumferentially oriented side parts immediately axially adjacent to the center part, wherein the side parts are less abradable than the center part; and
   wherein an abradable differentiation between the center part and the side parts is achieved by using a different impregnation matrix material for the center part and the side parts.

2. The abradable coating system according to claim 1, wherein the center part comprises layers of different abradability or a single layer with a graded abradability within said single layer.

3. The abradable coating system according to claim 2, wherein:
   the center part comprises a plurality of layers each having the same tissue but having different impregnation in each layer, or
   the center layer includes a single layer with a graded impregnation.

4. The abradable coating system according to claim 3, wherein the impregnation differs by type of filler particles, density of filler particles, type of filler fibers, density of filler fibers, type of binder material, density of binder material, or combinations thereof.

5. The abradable coating system according to claim 1, wherein the filler particles or filler fibers are formed from a material selected from the group consisting of ceramic, glass, glass-ceramic, ceramic-metal composite, and combinations thereof.

6. The abradable coating system according to claim 1, wherein the inorganic binder is selected from the group consisting of alkali silicate, alumino silicate, and aluminum phosphate.

7. The abradable coating system according to claim 1, wherein the at least one block has a height along the radial direction with respect to the axis of rotation in the range of 0.2-4 mm.

8. The abradable coating system according to claim 1, wherein an outer surface of the center part comprises surface texturing.

9. The abradable coating system according to claim 1, further comprising:
   cooling elements including channels, grooves, or both, in the at least one block.

10. The abradable coating system according to claim 1, wherein the at least one block comprises a monoblock or an assembly of several blocks.

11. The abradable coating system according to claim 1, wherein fibers of the woven or non-woven tissue are aligned along a rotation direction.

12. The abradable coating system according to claim 1, further comprising:
    said turbine or compressor component;
    wherein the at least one block is on said component attached with a matrix.

13. The abradable coating system according to claim 12, wherein the matrix comprises filler particles, filler fibers embedded in inorganic polymer, or combinations thereof.

14. A method for the repair of an abradable coating portion of a turbine or a compressor component, the method comprising:
    attaching at least complete abradable coating system according to claim 1 to the component.

15. The method according to claim 14, further comprising before said attaching:
    inspecting the coating; and
    at least partially removing, cleaning, surface treating, or combinations thereof, a damaged portion of the component.

16. The method according to claim 14, wherein attaching comprises attaching with a matrix.

17. The method according to claim 14, wherein attaching comprises attaching on at least a fraction of a center part of a damaged portion of the component.

18. The method according to claim 14, further comprising: inspecting the repaired coating.

19. The abradable coating system according to claim 1, wherein the side parts are erosion resistant.

20. A method for the preparation of an abradable coating system on a turbine or compressor component, the turbine or compressor defining an axis of rotation and having blading and a component on which said system can be applied, and wherein the abradable coating system includes a center part having an abradability which is graded along a radial direction with respect to the axis of rotation, such that the surface region of a side facing the blading is more abradable than an opposite side facing the component, wherein the center part is stripe-like and circumferentially oriented, and a pair of stripe-like, circumferentially oriented side parts immediately axially adjacent to the center part, the method comprising:
    (A1) first attaching a woven or non-woven tissue or foam made of a material selected from the group consisting of ceramic, glass, glass-ceramic, ceramic-metal composite, and combinations thereof, to the component or to a previous tissue or foam with a matrix, and
    (A2) second impregnating the woven or non-woven tissue or foam with filler particles or fibers formed of a material selected from the group consisting of oxide precursor, oxide, and combinations thereof, with a binder of organic or inorganic polymer, or with both; or
    (B1) first impregnating a woven or non-woven tissue or foam made of a material selected from the group consisting of ceramic, glass, glass-ceramic, ceramic-metal composite, and combinations thereof, with filler particles or fibers selected from the group consisting of oxide precursor, oxide, and combinations thereof, with a binder selected formed from organic or inorganic polymer, or with both, and optionally pre-sintering, to form a matrix impregnated tissue, and (B2) second attaching the matrix impregnated tissue to the component or the previous tissue or foam with a matrix, (C) third heat treating the abradable coating system after (A2) or (B2), and (D) producing an abradable differentiation between the center part and the side parts either before or after heat treating the abradable coating system, wherein the center part is highly abradable such that it can be abraded by the blading, and the side parts are less abradable than the center part; and achieving the abradable differentiation between the center part and the side parts by using a different impregnation matrix material for the center part and the side parts.

21. The method according to claim 20, wherein, in (A1) and (B2), the matrix comprises:

filler particles, filler fibers, or both, formed from oxide precursor, oxide, and combinations thereof; or a binder formed from organic or inorganic polymer; or both.

22. The method according to claim 20, further comprising: repeating steps (A1) and (A2) as often as required before performing step (C).

23. The method according to claim 20, further comprising: repeating steps (B1) and (B2) as often as required before performing step (C).

24. The method according to claim 20, wherein (A2) or (B1) comprises differentially impregnating or differentially selecting a matrix material to form grading of abradability along the radial direction of the abradable coating system.

25. The method according to claim 20, further comprising: repeating (A1) plus (A2), or (B1) plus (B2), and (C), to form a multitude of abradable coating elements.

26. The method according to claim 20, further comprising: forming a preform before (A1) or between (B1) and (B2).

27. The method according to claim 26, wherein the component is a new component or a component requiring repair.

28. The method according to claim 20, wherein the side parts are erosion resistant.

* * * * *